United States Patent [19]

Van Uffelen

[11] 4,295,222
[45] Oct. 13, 1981

[54] ARRANGEMENT FOR RESTITUTING THE CLOCK FOR A RECEIVER OF DATA TRANSMITTED BY PHASE MODULATION OF A CARRIER

[75] Inventor: Jean-Pierre H. Van Uffelen, Chevilly Larue, France

[73] Assignee: Telecommunications Radioelectriques et Telephoniques, Paris, France

[21] Appl. No.: 120,015

[22] Filed: Feb. 8, 1980

[30] Foreign Application Priority Data

Feb. 15, 1979 [FR] France ............................. 79 03833

[51] Int. Cl.³ ............................................. H04L 7/04
[52] U.S. Cl. ................................. 375/106; 375/111; 375/113
[58] Field of Search ............... 375/12, 13, 15, 83–87, 375/95, 96, 97, 110, 111, 119, 120, 121; 455/337, 214, 263, 258; 364/514, 571; 328/63, 155; 329/50, 103, 118

[56] References Cited

U.S. PATENT DOCUMENTS

| | | | |
|---|---|---|---|
| 3,491,305 | 1/1970 | Stone | 329/103 |
| 3,646,447 | 2/1972 | Van Gerwen | 375/94 |
| 3,806,815 | 4/1974 | Fletcher | 375/120 |
| 3,818,347 | 6/1974 | Holsinger | 375/120 |
| 3,962,637 | 6/1976 | Motley | 375/15 |
| 4,004,226 | 1/1977 | Qureshi | 375/13 |
| 4,025,719 | 5/1977 | Nussbaumer | 375/83 |
| 4,182,932 | 1/1980 | Fisher | 179/1 GS |

*Primary Examiner*—Benedict V. Safourek
*Assistant Examiner*—Stephen Chin
*Attorney, Agent, or Firm*—Thomas A. Briody; William J. Streeter; Edward W. Goodman

[57] ABSTRACT

This arrangement for restituting the clock is used to sample the demodulated signals formed by demodulation of the received signal by means of the signals which are in phase with and shifted through 90° relative to a local carrier. The arrangement according to the invention comprises logic circuit to detect to which phase section out of n possible phase sections of the transmitted signals the phase of the received signal belongs at the sampling instants, and calculation to form the component which is in phase or shifted through 90°, of a signal derived from the received signal by means of a phase shift $\Delta\theta$ to make its phase equal, at the sampling instants, to the center phase of the detected phase section. The zero-passages of this component are used to control the local clock.

6 Claims, 9 Drawing Figures

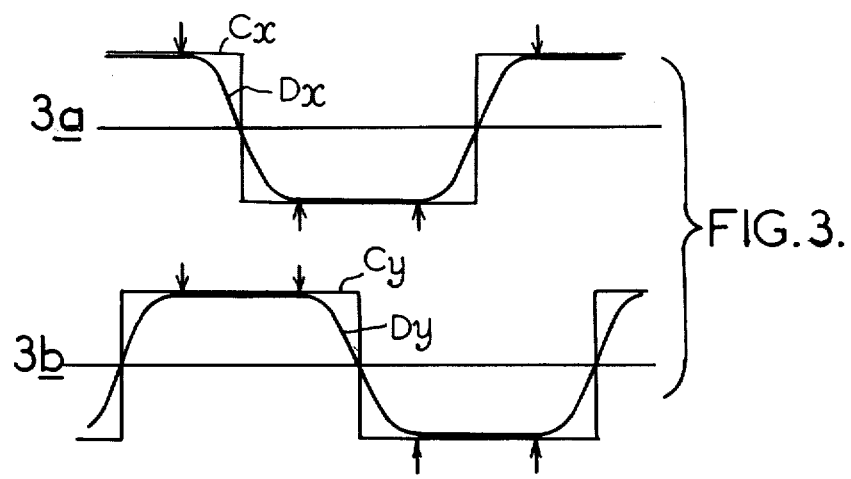
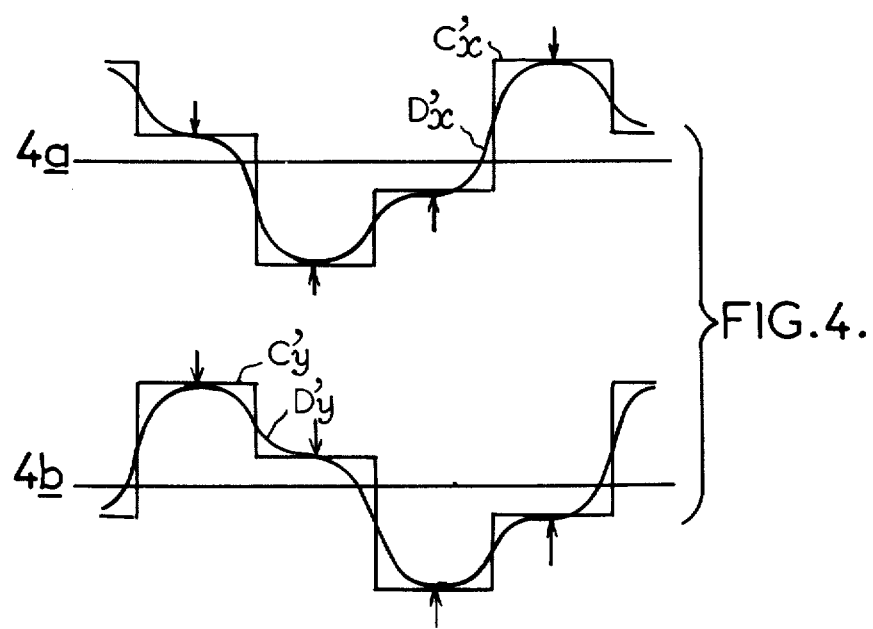

ARRANGEMENT FOR RESTITUTING THE CLOCK FOR A RECEIVER OF DATA TRANSMITTED BY PHASE MODULATION OF A CARRIER

BACKGROUND OF THE INVENTION

The invention relates to an arrangement for restituting a clock, included in the receiver of a system for the transmission of data by n-valent phase modulation of a carrier and used to sample the demodulated signals obtained by demodulation of the received signal with the modulation frequency by means of signals, which are in phase and in quadrature-phase with a local carrier, the arrangement for restituting a clock comprising a circuit for controlling a local clock on the zero-passages of a signal.

This arrangement has for its object to restitute in the receiver, from the received phase-modulated signal, a local clock which is in synchronism with the clock used in the transmitter for modulating the carrier, in order to sample, with a proper phase, the two orthogonal signals obtained by modulation of the signal received from a locally generated carrier. Such a sampling with a local clock which is in synchronism with the clock of the transmitter, is indispensable for the proper restitution of the phases and, consequently, of the transmitted data.

It is known to use one or the other of two orthogonal signals which are demodulated from the locally generated carrier, as the signal whose zero-passages are used to control the local clock. But this known method is only suitable for use when the phase of the generator generating the local carrier is accurately locked on the phase of the generator generating the carrier in the transmitter. If, for some reason or another, a phase control between the carrier of the transmitter and the receiver has not been provided or is not possible, a variable phase deviation is produced between the carriers of the transmitter and the receiver, resulting in that the instants at which the demodulated signals pass through zero are poorly defined and are not suitable for synchronizing the clock of the receiver with the clock of the transmitter. In certain types of receivers it is further not possible to obtain phase control between the carriers of the transmitter and the receiver before synchronization of the clocks has been obtained, which presents a problem at the start of a data transmission.

SUMMARY OF THE INVENTION

The present invention has for its object to mitigate these drawbacks by providing an arrangement for restituting clock pulses which is adapted to operate with a local carrier whose phase is not locked onto the phase of the transmitter.

According to the invention, an arrangement for restituting the clock pulse for a receiver of data transmitted by n-valent phase modulation of a carrier, comprises logic means for detecting from the samples of the demodulated signal, to which phase section, out of n possible phase sections of the transmitted signals, the phase of the received signal belongs at the sampling instants, and calculating means to form the in-phase component or the component shifted through 90° with respect to the local carrier of a signal derived from the received signal by means of a phase shift $\Delta\theta$, so as to make its phase equal, at the sampling instant to the central phase of the detected phase section, said in-phase component or quadrature-phase component being the signal whose zero-passages are used to control the local clock.

DESCRIPTION OF THE DRAWINGS

The following description given by way of non-limitative example with reference to the accompanying drawings will explain in greater detail how the invention can be carried into effect.

The two diagrams of FIG. 3 show the shape of the demodulated signals when the carriers of the transmitter and the receiver are accurately in the same phase.

The two diagrams of FIG. 4 show the shape of the demodulated signals when there is a phase deviation between the carriers of the transmitter and the receiver.

Figure 5:
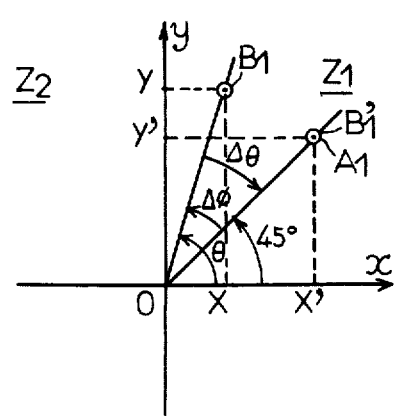
Figure 6:
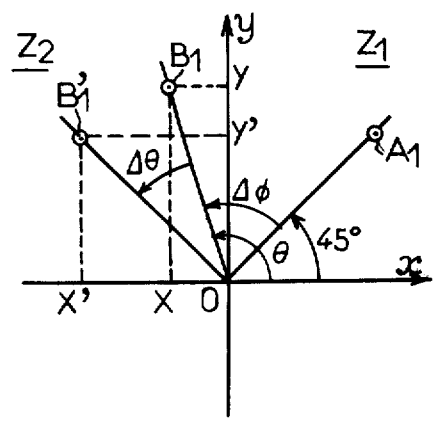

FIGS. 5 and 6 are phase diagrams to explain the operation of the arrangement according to the invention.

Figure 7:
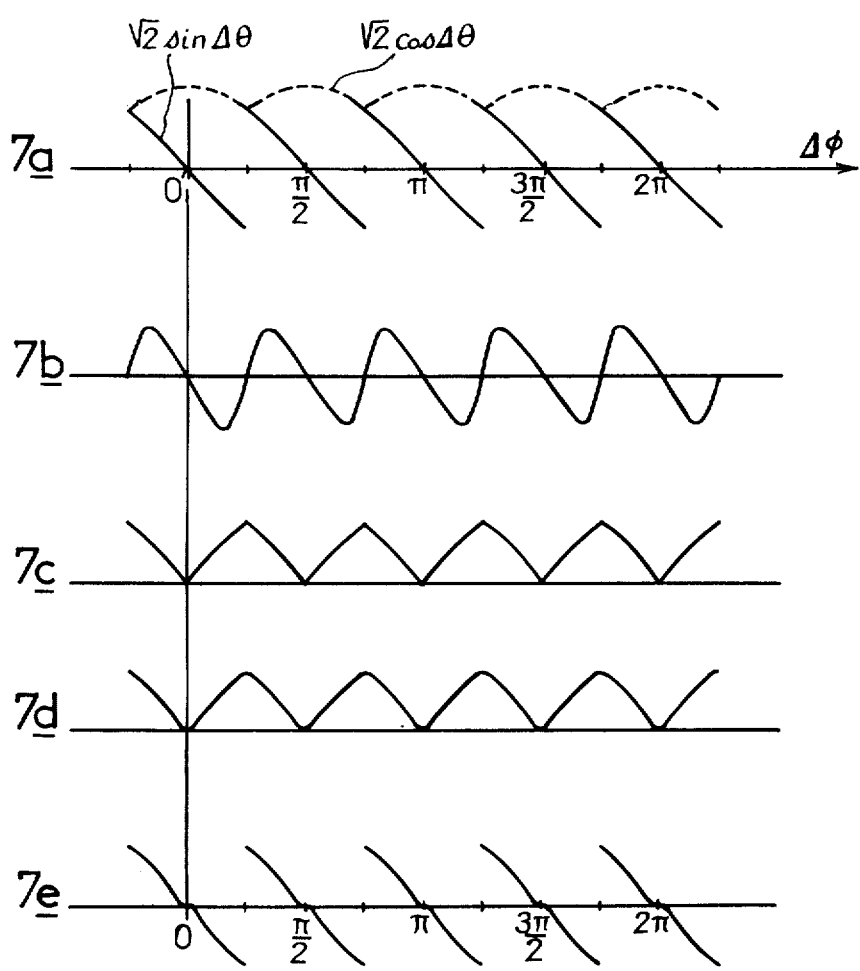

The diagrams of FIG. 7 show signals illustrating the filtering operations to be effected on the samples corresponding to the values $\cos \Delta\theta$ and $\sin \Delta\theta$ in the arrangement according to the invention.

Figure 8:
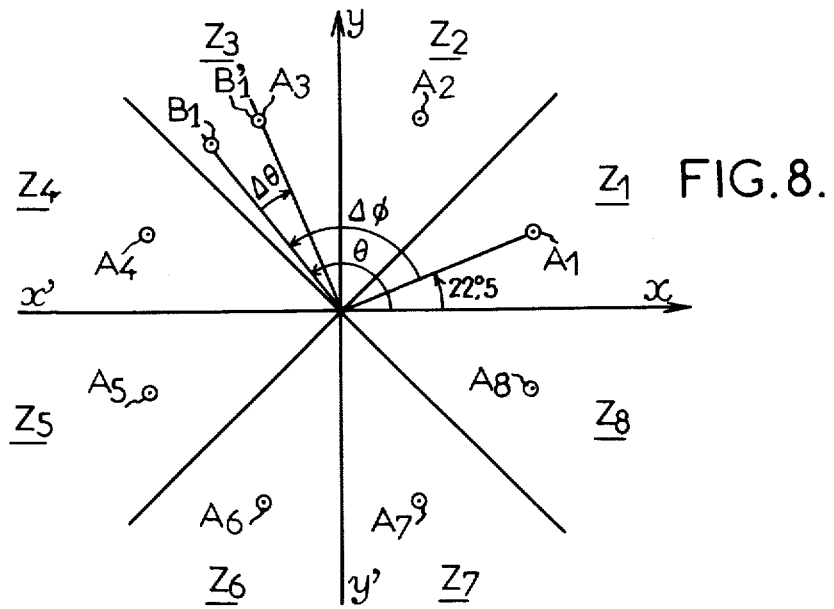

FIG. 8 is a phase diagram which represents the transmitted and received signals in the case of eight-phase modulation.

Figure 9:
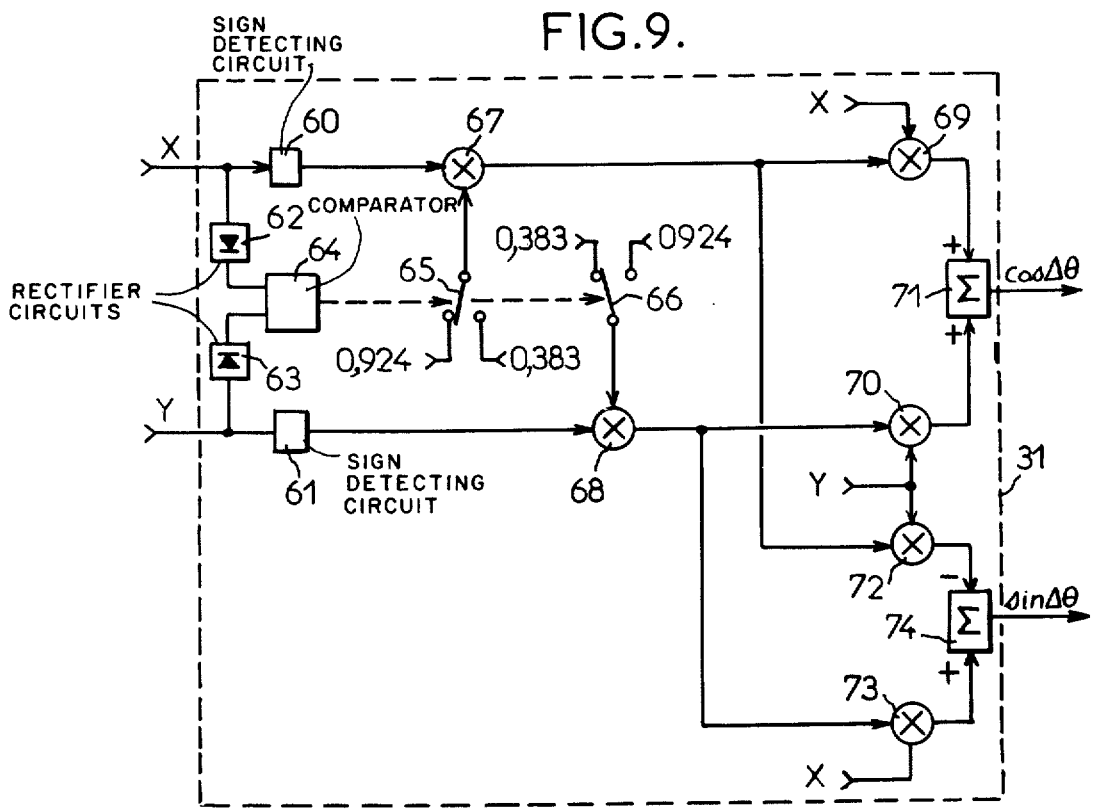

FIG. 9 is a diagram of a circuit which calculates the samples $\cos \Delta\theta$ and $\sin \Delta\theta$ in the case of eight-phase modulation.

DESCRIPTION OF THE PREFERRED EMBODIMENT

Figure 1:
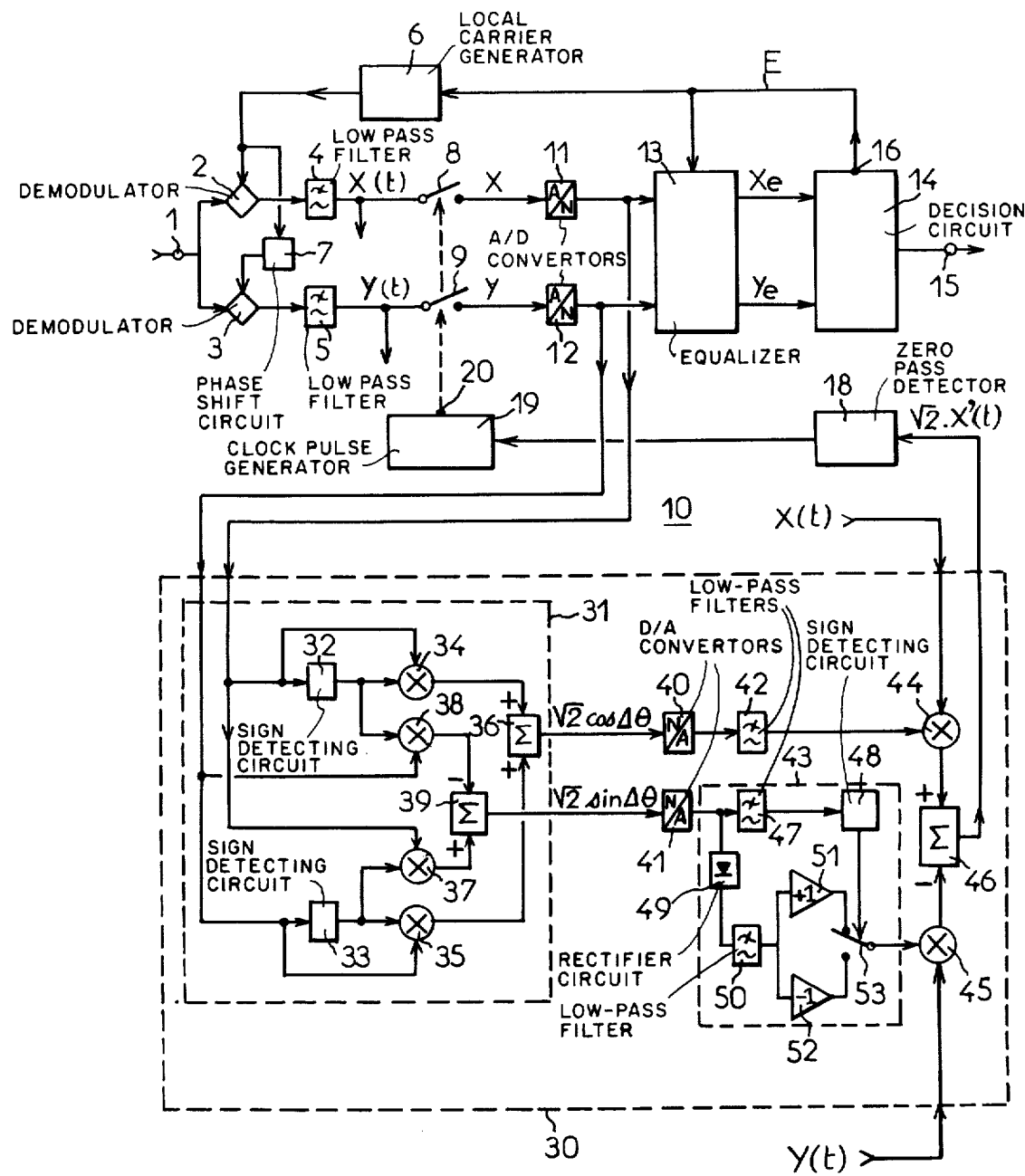
FIG. 1 is a circuit diagram of a receiver comprising the clock pulse restituting arrangement according to the invention, adapted to quadrature phase modulation.

FIG. 1 shows the circuit diagram of a receiver of data transmitted by phase modulation of a carrier, the receiver comprising a circuit 10 for restituting the clock according to the invention. The received phase modulated signal present at the input 1 of the receiver is applied to two demodulators 2 and 3, which are followed by low-pass filters 4 and 5. The demodulator 2 is supplied with a signal which is in-phase with the local carrier produced by the local carrier generator 6 and the demodulator 3 is supplied with a signal whose phase is shifted 90° with respect to the local carrier and which is derived from the generator 6 by the phase shifting circuit 7.

The demodulated signals X(t) and Y(t), which are in phase with and whose phase has been shifted 90° relative to the local carrier, respectively, are obtained at the outputs of the low-pass filters 4 and 5. These signals X(t) and Y(t) are sampled by means of sampling circuits 8 and 9, which operate with a sampling rate which must be equal to the modulation frequency 1/T in the transmitter and must be in synchronism with the latter. This sampling frequency is obtained by means of the clock restituting circuit 10 which must recover with the proper phase, from the received signal, the clock frequency which is used in the transmitter to modulate the carrier.

In the receiver considered here, the sampled signals X, Y produced by the sampling circuits 8 and 9 are converted into digital signals by means of analog-to-digital converters 11, 12 and applied in this form to the equalizer 13, which is of the digital type and has for its object to compensate for distortions, particularly phase distortions, suffered from the transmission means. The equalized digital signals $X_e$, $Y_e$ together provide an equalized signal whose phase is, in the operating condition, very close to the phase of the signal transmitted at the sampling instants. These signals $X_e$, $Y_e$ are applied to a decision circuit 14, in which the phase of the equalized signal is compared with the possible transmitted phases. Based on the result of this comparison, the transmitted phase is restituted at each sampling instant at the output 15 of the decision circuit 14, and the phase deviation E between the phase of the equalized signal and the transmitted phase being restituted at the output 16. This phase deviation E is applied to the equalizer 13 to have the required corrections performed there and also to the generator 6, in which a control of the local carrier is effected. A receiver of the above-described construction is disclosed in French Pat. No. 2,319,251, U.S. Ser. No. 598,252. When the phase of the local carrier of the receiver is not very accurately locked on the phase of the carrier of the transmitter there may be some problems in the restitution of the clock pulse.

To understand this problem and to demonstrate how the invention solves it, the case in which the phase modulation used in the transmitter to transmit the data is tetravalent, the 4 possible phases of the carrier transmitted by the transmitter therefore being 45°, 135°, 225° and 315°, will now first be described with respect to the phase of the reference carrier of the transmitter.

Figure 2:
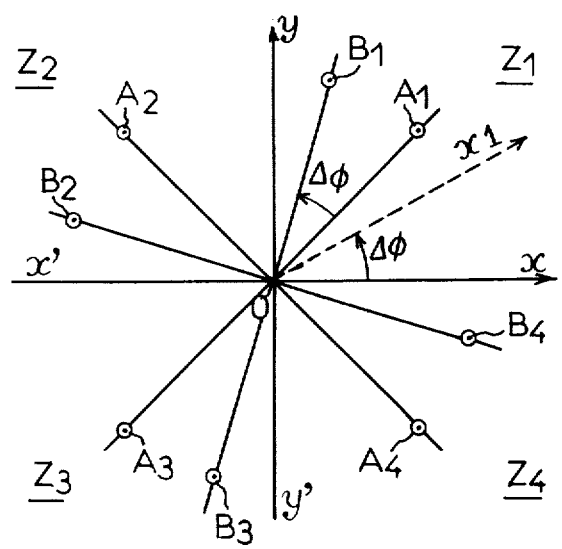
FIG. 2 shows a phase diagram representing the signals transmitted and received in the case of quadrature phase modulation.

In the phase diagram of FIG. 2, the two rectangular axes x'Ox and y'Oy define four quadrants denoted $Z_1$, $Z_2$, $Z_3$ and $Z_4$, respectively, and the half-way points on the axis Ox have the phase zero of the reference carrier of the receiver. When the carriers of the transmitter and the receiver are accurately in phase, the received signal may be represented by one of the four points $A_1$, $A_2$, $A_3$ and $A_4$ having the phases used during the transmission to modulate the carrier and which are located on the bisectors of the four quadrants. Demodulation by means of the demodulators 2 and 3 results in the demodulated signals $X(t)$ and $Y(t)$, which are represented by the coordinates of one of the points $A_1$, $A_2$, $A_3$ and $A_4$, respectively, to appear at the output of filters 4 and 5.

The clock restitution device 10 has for its object to derive a local clock from the signal coming from the receiver whereby it is possible, by means of the sampling circuits 8 and 9, to sample the demodulated signals $X(t)$ and $Y(t)$ at instants which allow a proper restitution of the transmitted phases.

In the above-described case, where the carriers of the transmitter and the receiver are accurately in phase these proper sampling instants can be perfectly defined relative to the instants at which the demodulated signals $X(t)$ or $Y(t)$ pass through zero, as will now be further explained with reference to the diagrams of FIG. 3.

The diagrams 3a and 3b, respectively, show the shape of the demodulated signals $X(t)$ and $Y(t)$ during four consecutive time intervals T(1/T being the modulation frequency) during which the received signal is represented successively by the points $A_1$, $A_2$, $A_3$ and $A_4$. The rectangular curves $C_x$, $C_y$ represent the demodulated signals $X(t)$ and $Y(t)$ for the ideal case, not used in practice, in which the bandwidth of the transmitted signals is not limited. The curves with rounded edges $D_x$, $D_y$ represent the same signals in the practical case in which the bandwidth of the transmitted signals is limited. The practical signals $X(t)$ and $Y(t)$ represented by the curves $D_x$ and $D_y$ have zero-passage instants which coincide with the transition instants of the curves $C_x$ and $C_y$. The proper sampling instants, shown by means of arrows, are located in the centre of the time intervals T and may consequently result from the zero-passage instants of the demodulated signals $X(t)$ or $Y(t)$.

When the carriers of the transmitter and the receiver are accurately in phase it is therefore possible to use in the clock restitution circuit 10 a zero-passage detector circuit 18, which detects the passage through zero and to which either the signal $X(t)$ or the signal $Y(t)$ is applied directly. The pulses produced by this detector 18 at the instants at which $X(t)$ or $Y(t)$ pass through zero are used to control the phase of a clock pulse generator 19, which furnishes the sampling pulses of the signals $X(t)$ and $Y(t)$ with the proper phase at its output 20.

But, as will be further explained hereinafter, when the carriers of the transmitter and the receiver are not in phase, a local clock which permits a proper sampling of these signals is not obtained on the basis of the zero-passages of the demodulated signals $X(t)$ or $Y(t)$. Let it, for example, be assumed that the carrier of the transmitter has a phase which leads the phase of the carrier of the receiver by $\Delta\phi$, and the phase diagram of FIG. 2 shows the semi-axis Ox, whose points have the reference phase of the transmitter and which have therefore a phase lead $\Delta\phi$ relative to the points of the semi-axis $Ox_1$, which represents the reference phase of the receiver. In these circumstances the received signal is represented by one of the points $B_1$, $B_2$, $B_3$ or $B_4$, whose phase leads the phase of the corresponding points $A_1$, $A_2$, $A_3$ or $A_4$ by $\Delta\phi$. The demodulated signals $X(t)$ and $Y(t)$ appearing in the receiver at the output of the filters 4 and 5 are represented by the coordinates of the points $B_1$, $B_2$, $B_3$ or $B_4$ in the system of rectangular axes x'Ox and y'Oy.

FIG. 4 shows, in the same way as in the diagrams 3a and 3b of FIG. 3 curves which represent the shape of the demodulated signals $X(t)$ and $Y(t)$ when the received signal is represented successively by the points $B_1$, $B_2$, $B_3$ and $B_4$. The rectangular curves $C'_x$ and $C'_y$ represent the signals $X(t)$ and $Y(t)$ for the ideal case where the bandwidth of the transmitted signals is not limited, whereas the curves having the rounded sides $D'_x$ and $D'_y$, represent the signals $X(t)$ and $Y(t)$ for the practical case in which the bandwidth of the transmitted signals is limited. The instants at which the practical signals represented by the curves $D'_x$ and $D'_y$ pass through zero do not coincide with the signal transitions represented by the curves $C'_x$ and $C'_y$. It can be easily seen that when the phase deviation $\Delta\phi$ between the carriers of the transmitter and the receiver is variable, the instants at which the practical signals pass through zero, represented by the curves $D'_x$ and $D'_y$ will also have a position which is variable with respect to the signal transitions represented by the curves $C'_x$ and $C'_y$. As the proper sampling instants (represented by arrows) are located in the centre of the time intervals T, defined by these transitions, it is obvious that a control of the local clock of the receiver based on the instants at which the signals $X(t)$ and $Y(t)$ pass through zero would not be able to furnish the proper sampling instants. It should also be noted that when the phase deviation $\Delta\phi$ reaches a multiple at 90°, causing the points $B_1$, $B_2$, $B_3$ or $B_4$ to become located on the axis x'Ox or y'Oy, one of the signals $X(t)$ or $Y(t)$ is cancelled during a whole time interval T, which still further increases the drawback of the process of controlling the local clock on the basis of the zero-passages of the signals $X(t)$ or $Y(t)$.

A variable phase difference between the carriers of the transmitter and the receiver is of course produced when the generator of the local carrier of the receiver operates independently of the generator of the transmitter carrier. Even when a control is provided between the two generators the same problem may be met again. For example, at the start of the receiver, shown in FIG. 1 the control of the generator 6 of the local carrier of the receiver cannot be obtained until synchronization of the local clock has been accomplished, since a signal having a phase deviation E, resulting from the equalized signal obtained from the equalizer 13 is used to control the local carrier; this equalizer 13 itself cannot operate properly until the demodulated signals X(t) and Y(t) have been sampled with the proper phase by means of the local clock. Moreover, when the transmission between the transmitter and the receiver is effected over a radio channel, causing multiple paths of the carrier wave, the phase of the carrier wave is poorly defined on reception and it is only possible to effect in the generator 6 a frequency control of the carrier of the receiver with respect to that of the transmitter, a phase control not being possible. Therefore, the problem to obtain a local clock of the receiver which makes a proper sampling of the demodulated signals possible, in spite of a variable phase difference between the carriers of the transmitter and the receiver, still remains.

According to the invention this problem is solved by replacing the demodulated signal X(t) or Y(t), applied in the known clock restitution device to the zero-passage detector circuit 18, by another signal X'(t) or Y'(t), which is processed in the device 30.

The operations effected in this device 30 consist firstly in investigating to which phase sector $Z_1$, $Z_2$, $Z_3$ or $Z_4$ the phase $\theta$ of the received signal, represented by the points $B_1$, $B_2$, $B_3$ or $B_4$ belongs at each sampling instant, whereafter a new signal is formed which is derived from the received signal by a phase shift $\Delta\theta$, so as to make the phase of this signal equal, at the sampling instants, to the central phase, 45°, 135°, 225°, 315° of the said detected phase section. The components which are of the same phase or whose phase is shifted 90° relative to the local carrier of this new signal are the desired signals X'(t) and Y'(t).

These operations will now be explained in a more precise manner in two Examples illustrated by the phase diagrams of the FIGS. 5 and 6, which are drawn up in the same manner as the diagram of FIG. 2 and have been given the same reference numerals. In the diagram of FIG. 5, the point $B_1$ represents at a sampling instant the received signal when the carrier is transmitted with a phase of 45° and the reference carrier of the transmitter has a phase which leads the phase of the receiver by $\Delta\phi$, where $\Delta\phi < 45°$. The received signal would be represented by the point $A_1$ when $\Delta\phi$ would be equal to 0. On the basis of the samples X, Y of the demodulated signals X(t) and Y(t), these samples being represented by the coordinates of the point $B_1$, it is possible to detect, as will be shown hereinafter, that the phase of the signal represented by the point $B_1$ belongs to the quadrant $Z_1$. By effecting a phase shift $\Delta\theta = -\Delta\phi$, which is equal to the difference between the centre phase of the quadrant $Z_1$, i.e. 45°, and the phase of the received signal, a new signal is obtained having a phase of 45° and being represented, at the sampling instant, by the point $B'_1$ located on the bisector of the quadrant $Z_1$. This point $B'_1$ coincides with the point $A_1$ and its coordinates X' and Y' represent the samples of the desired signals X'(t) and Y'(t).

In the diagram of FIG. 6, the point $B_1$ represents, at a sampling instant, the signal received when the carrier is transmitted with a phase of 45°, but the reference carrier of the transmitter has a phase which leads the phase of the receiver by $\Delta\phi > 45°$, so that the point $B_1$ is, for example, in the quadrant $Z_2$. In this case a phase shift $\Delta\theta$ which is equal to the difference between the central phase of the quadrant $Z_2$ and the phase of the signal received at the sampling instant is effected on the received signal so that $\Delta\theta = 135° - (45° + \Delta\phi) = 90° - \Delta\phi$. The new signal thus obtained has a phase of 135° and its representation at the sampling instant is found on the bisector of the quadrant $Z_2$. The coordinates X' and Y' of the point $B'_1$ represent the samples of the desired signals X'(t) and Y'(t).

The phase shift $\Delta\theta$ to be effected on the received signal has an absolute value below 45°. This phase shift may assume the shape $\Delta\theta = k\cdot 90° - \Delta\phi$, k being such that $\Delta\theta$ gets an absolute value below 45°. The components X'(t) and Y'(t) of the new signal resulting from this phase shift $\Delta\theta$ shows the characteristics of the demodulated signals which would be obtained by demodulation of the received signal by means of a local carrier which, but for $k\cdot 90°$, is in phase with the carrier of the transmitter. These components X'(t) and Y'(t) have perfectly defined zero-passing instants, but for kT, as the signals represented by the curves $D_x$ and $D_y$ in the diagram of FIG. 3, and are therefore perfectly suitable for controlling the local clock of the receiver. It should be noted that the signals K·X'(t) and K·Y'(t) which are in proportion with the components X'(t) and Y'(t) would show the same zero-passage characteristics.

Several formulae, which correspond to the operations described above and which are performed in the calculating device 30 will now be explained.

The desired components X'(t) and Y'(t) may be written:

$X'(t) = \rho \cos(\theta + \Delta\theta)$ $Y'(t) = \rho \sin(\theta + \Delta\theta)$ $\rho$ being the amplitude of the received signal
$\theta$ being the phase of the received signal
$\Delta\theta$ being the phase shift to be effected on the received signal in the manner described above.

Taking: $\rho \cos\theta = X(t)$ and $\rho \sin\theta = Y(t)$ into account we obtain:

$X'(t) = X(t)\cdot\cos\Delta\theta - Y(t)\cdot\sin\Delta\theta$ \hfill (1)

$Y'(t) = Y(t)\cdot\cos\Delta\theta + X(t)\cdot\sin\Delta\theta$ \hfill (2)

To determine the phase shift $\Delta\theta$ occurring in these formulae (1) and (2), it is necessary to find to which phase section $Z_1$, $Z_2$, $Z_3$ or $Z_4$, the phase $\theta$ of the received signal belongs at each sampling instant. This may be furnished by the sign of the samples X and Y of the demodulated signals X(t) and Y(t), in accordance with the following Table I, in which "Sgn" means "sign of".

TABLE I

| Sgn (X) | Sgn (Y) | quadrant |
|---------|---------|----------|
| +       | +       | $Z_1$    |
| −       | +       | $Z_2$    |
| −       | −       | $Z_3$    |
| +       | −       | $Z_4$    |

It is now easy to show by means of the diagrams of FIGS. 5 and 6 that the values for $\cos \Delta\theta$ and $\sin \Delta\theta$ are, at the sampling instant:

$$\sqrt{2} \cos \Delta\theta = X \cdot \mathrm{Sgn}(X) + Y \cdot \mathrm{Sgn}(Y) \quad (3)$$

$$\sqrt{2} \sin \Delta\theta = X \cdot \mathrm{Sgn}(Y) - Y \cdot \mathrm{Sgn}(X) \quad (4)$$

By replacing $\cos \Delta\theta$ and $\sin \Delta\theta$ in the formulae (1) and (2) by the proportional values $\sqrt{2} \cos \Delta\theta$ and $\sqrt{2} \sin \Delta\theta$ given by the formulae (3) and (4), the signals $\sqrt{2} \cdot X'(t)$ and $\sqrt{2} \cdot Y'(t)$ which are proportional to the signals $X'(t)$ and $Y'(t)$ are obtained, which have obviously the same zero-passage characteristics.

Therefore, the calculating device 40 of FIG. 1 has for its object to form, using the formulae (1) and (2), either the signal $\sqrt{2} \cdot X'(t)$, or the signal $\sqrt{2} \cdot Y'(t)$, the values of $\sqrt{2} \cdot \cos \Delta\theta$ and $\sqrt{2} \sin \Delta\theta$ being calculated in accordance with the formulae (3) and (4) for the case, shown in this Figure, of a four-phase modulation. More generally, the device 30 has for its object to form the signals $K \cdot X'(t)$ or $K \cdot Y'(t)$ in proportion with $X'(t)$ and $Y'(t)$. In the present case the calculations are simple, when $K = \sqrt{2}$.

The device 30 comprises an input circuit 31 which calculates the values of $\sqrt{2} \cos \Delta\theta$ and $\sqrt{2} \sin \Delta\theta$. In the above-described embodiment the circuit 31 is of the digital type and operates on the samples X and Y, which have been converted to the digital form by means of the analog-to-digital converters 11 and 12. At the input of the circuit 31 the samples X and Y are applied to the sign detecting circuits 32 and 33, respectively, whose logic output signals Sgn [X] and Sgn [Y] provide the information of the quadrant to which the received signal belongs at each sampling instant. The multiplying circuits 34 and 35, respectively, form at each sampling instant the products $X \cdot \mathrm{Sgn}\,[X]$ and $Y \cdot \mathrm{Sgn}[Y]$ and the adder circuit 36 produces the sum of these products so that, in accordance with formula (3), the digital samples corresponding to the values $\sqrt{2} \cos \Delta\theta$ at the sampling instants are obtained at the output of the adder circuit 36. Similarly, the multiplying circuits 37 and 38 form the products $X \cdot \mathrm{Sgn}\,[Y]$ and $Y \cdot \mathrm{Sgn}\,[X]$, respectively, and the subtraction circuit 39 produces the difference between these products, so that, in accordance with formula (4), the digital samples corresponding to the values $\sqrt{2} \mathrm{Sgn}\, \Delta\theta$ at the sampling instants are obtained at the output of the subtracting circuit 39.

In the embodiment shown in FIG. 1, the digital samples $\sqrt{2} \cos \Delta\theta$ and $\sqrt{2} \sin \Delta\theta$ are converted into the analog state by means of the digital-to-analog converters 40 and 41 and the analog samples obtained are applied to the analog low-pass filter circuits 42 and 43 which supply the analog signals representing $\sqrt{2} \cos \Delta\theta$ and $\sqrt{2} \sin \Delta\theta$. Hereinafter, it will be shown that filtering the samples $\sqrt{2} \sin \Delta\theta$ poses a special problem and an advantageous embodiment of the filtering circuit 43 will be described by means of which this problem can be solved.

The analog signals $\sqrt{2} \cos \Delta\theta$ and $\sqrt{2} \sin \Delta\theta$, supplied by the filtering circuits 42 and 43 are applied to an input of the analog multiplying circuits 44 and 45, whose other input receives the demodulated signals X(t) and Y(t). The products $X(t) \cdot \sqrt{2} \cos \Delta\theta$ and $Y(t) \cdot \sqrt{2} \sin \Delta\theta$, thus obtained, are applied to the difference circuit 46 which, in accordance with the above formula (1) produces the analog signal $\sqrt{2} \cdot X'(t)$. As explained above, this signal $\sqrt{2} \cdot X'(t)$ is suitable, by its zero passage, to control the local clock of the receiver and it is therefore applied to the zero-passage detecting circuit 18, whose output is connected to the clock pulse control circuit 19.

Instead of forming the signal $\sqrt{2} \cdot X'(t)$ in the calculating device 30 it is alternatively possible to form the analog signal $\sqrt{2} \cdot Y'(t)$, which is also suitable to control the local clock. This signal $\sqrt{2} \cdot Y'(t)$ may be formed in a similar manner, in accordance with formula (2), by means of the analog signals $\sqrt{2} \cos \Delta\theta$ and $\sqrt{2} \sin \Delta\theta$ and the demodulated signals X(t) and Y(t).

In the embodiment shown in FIG. 1, the calculating device 30 comprises an input circuit 31, which operates in a digital mode to produce the digital samples $\sqrt{2} \cos \Delta\theta$ and $\sqrt{2} \sin \Delta\theta$, two digital-to-analog converters 40 and 41 and also filters 42, 43 and the calculating circuits 44, 45, 46 operating on the analog signals. It is clear for one skilled in the art that it is alternatively possible to use a calculating device 30 which only comprises analog calculating circuits. Then the input circuit 31 would form analog samples $\sqrt{2} \cos \Delta\theta$ and $\sqrt{2} \sin \Delta\theta$ directly from the analog samples X and Y, produced by the sampling circuits 8 and 9. Alternatively, it would be possible to form the digital version of the signal $X'(t)$ or of the signal $Y'(t)$ by means of the filters 42, 43 and the calculating circuits 44, 45, 46 of the digital type, whereafter these signals are converted, at the output of the calculating device 30, into the analog signal $X'(t)$ or $Y'(t)$.

There now follows an explanation of the problem furnished by filtering of the samples $\sqrt{2} \cos \Delta\theta$ and $\sqrt{2} \sin \Delta\theta$ in the filtering circuits 42 and 43. Especially when the transmission is effected over a radio channel, the signal received in the receiver may have been affected by adverse amplitude and, particularly, phase fluctuations which manifest themselves by a considerable noise in the samples $\sqrt{2} \cos \Delta\theta$ and $\sqrt{2} \sin \Delta\theta$. The filtering of the signal constituted by these samples in the filtering circuits 42 and 43 must have a sufficient energy to attenuate this noise, without, however, distorting the restituted analog signals $\sqrt{2} \cos \Delta\theta$ and $\sqrt{2} \sin \Delta\theta$ to prevent, ultimately, the passages through zero of the signal $X'(t)$ or $Y'(t)$ from being affected by noise and to see to it that they become located at their correct positions.

In the diagram 7a of FIG. 7 the curve $\sqrt{2} \cos \Delta\theta$ (dotted line) and the curve $\sqrt{2} \sin \Delta\theta$ (solid lines) are plotted as a function of the phase deviation $\Delta\phi$ between the carriers of the emitter and the receiver. These curves can be plotted easily, while taking into consideration, as mentioned above, that the absolute value of $\Delta\theta$ is lower than (or equal to) $\pi/4$ radians and is such that $\Delta\theta = k \cdot \pi/2 - \Delta\phi$. Let it be assumed that the phase deviation $\Delta\phi$ increases linearly versus the time. As the signal $\sqrt{2} \cos \Delta\theta$ has a slightly undulating form, without sudden amplitude variations, when the samples of this signal are affected by noise, it is possible to suppress this noise by filtering them significantly in the circuit 42, which causes only a negligible change in the values of $\sqrt{2} \cos \Delta\theta$ in the filtered signal. On the contrary, the signal $\sqrt{2} \sin \Delta\theta$ has sudden amplitude variations (from $-1$ to $+1$), each time the phase deviation $\Delta\phi$ is an odd multiple of $\pi/4$ radians, and if one wants to suppress the noise by filtering the samples significantly, the values of $\sqrt{2} \sin \Delta\theta$ will be considerably changed in the filtered signals for phase deviations $\Delta\phi$ near odd multiples of $\pi/4$. This is demonstrated by the curve of the diagram 7b, which represents the form of the signal $\sqrt{2} \sin \Delta\theta$ after it has been filtered significantly. It is clear that it is not possible to obtain from a signal $\sqrt{2} \sin \Delta\theta$, filtered in this manner, a signal X'(t) or Y'(t) with zero passages which are suitable for the control of the local clock.

To mitigate this drawback, the filtering circuit 43 is constructed in the following manner. The samples $\sqrt{2} \sin \Delta\theta$ are applied to low-pass filter 47, which performs a significant filtering action corresponding to the curve represented in the diagram 7b. This filtered signal has the same sign as the signal $\sqrt{2} \sin \Delta\theta$ of the diagram 7a and is applied to the sign detection circuit 48, whose function will be explained hereinafter. The samples $\sqrt{2} \sin \Delta\theta$ are also applied to the rectifier circuit 49. When the signal $\sqrt{2} \sin \Delta\theta$ of the diagram 7a is applied to the rectifier circuit 49, this circuit furnishes the rectified signal with the form shown in diagram 7c. The rectified samples supplied by the circuit 49 are filtered in the low-pass filter 50 and, in response to the rectified signal of the diagram 7c the filter 50 supplies the rectified and filtered signal shown in diagram 7d. It will be clear that the values of $\sqrt{2} \sin \Delta\theta$ in the rectified signal are affected to a much lesser extent by the filtering action than the signal having the values $\sqrt{2} \sin \Delta\theta$ without rectification, especially around the phase deviations $\Delta\theta$ which are an odd multiple of $\pi/4$. The rectified and filtered signal supplied by the filter 50 is also applied to the amplifiers 51 and 52, having the gains $+1$ and $-1$, respectively, and the change-over circuit 53, which is controlled by the output of the sign detection circuit 48 passes either the output of the amplifier 51 or the output of the amplifier 52 to the multiplier circuit 45. The output signal of the filter 50 is therefore influenced by the sign of the signal $\sqrt{2} \sin \Delta\theta$ shown in diagram 7a and the output signal of the filtering circuit 43 has then the form shown in diagram 7e. This signal has a shape which is very close to that of the ideal signal $\sqrt{2} \sin \Delta\theta$ shown in diagram 7a, particularly for the phase deviations $\Delta\theta$ which are near the odd multiples of $\pi/4$. This signal, from which the noise has been removed by filtering is suitable for use in the multiplier circuit 45, with the object of forming the signal X'(t).

So far, the clock restitution arrangement according to the invention has been described for the case of a receiver receiving the signals transmitted by modulation of a four-phase carrier. The invention applied in a general way to the case of n-phase modulation and there now follows the description of, for example, the arrangement according to the invention for the case in which signals reaching the receiver are the result of eight-phase modulation of a carrier.

In the case of such an octo-valent modulation the carrier is modulated by the data according to eight phases, odd multiples of 22°5. The diagram of FIG. 8 shows eight consecutive phase sections $Z_1$ to $Z_8$ of 45°. When the carrier of the receiver is accurately in phase with the carrier of the transmitter, the signal received in the receiver is represented by one of the points $A_1$ to $A_8$ having the centre phase of the eight phase sections. When there is a phase variation $\Delta\theta$ between the carriers of the transmitter and the receiver, the received signal is represented by the point $B_1$ located, for example, in the phase section $Z_3$, instead of being situated at $A_1$ when this phase deviation $\Delta\theta$ is zero. As for the case of four-phase modulation, by effecting a phase shift $\Delta\theta$ on the received signal represented by $B_1$ and the components X(t) and Y(t) so as to make the phase of the received signal equal, at the sampling instants, to the centre phase of the phase section in which the point $B_1$ is situated, a signal is obtained which is represented by the point $B'_1$, and which, in the chosen example, coincides with the point $A_3$ and whose components X'(t) or Y'(t) are suitable to control the local clock of the receiver.

The formulae (1) and (2) established above and supplying the desired components X'(t) and Y'(t) from the demodulated signals X(t) and Y(t), and the phase shift $\Delta\theta$ remain valid for the case of octovalent modulation. It will be seen, that, for this octovalent modulation, the absolute value of the phase shift is less than 22°5, and is related to the phase deviation $\Delta\theta$ between the carriers of the emitter and the receiver by the relation $\Delta\theta = k \cdot 90° - \Delta\phi$, k being an integer as, for example, $\Delta\theta < 22°5$.

Calculating the values which are equal or proportional to $\cos \Delta\theta$ and $\sin \Delta\theta$ is also based on the determination to which phase sections the phase of the received signal belongs at the sampling instants. This information may be supplied by the sign of the samples X and Y of the demodulated signals and by comparing the absolute values of these samples X and Y, in accordance with the following Table II.

TABLE II

| Sgn 8 X] | Sgn [Y] | \|X\| - \|Y\| | Section |
|---|---|---|---|
| + | + | >0 | $Z_1$ |
| + | + | <0 | $Z_2$ |
| − | + | <0 | $Z_3$ |
| − | + | >0 | $Z_4$ |
| − | − | >0 | $Z_5$ |
| − | − | <0 | $Z_6$ |
| + | − | <0 | $Z_7$ |
| + | − | >0 | $Z_8$ |

It is then easy to show that the values of $\cos \Delta\theta$ and $\sin \Delta\theta$ are: for $|X| - |Y| > 0$ $$\cos \Delta\theta = \text{Sgn}[X] \cdot 0.924 \cdot X + \text{Sgn}[Y] \cdot 0.383 \cdot Y \quad (5)$$

$$\sin \Delta\theta = \text{Sgn}[Y] \cdot 0.383 \cdot X - \text{Sgn}[X] \cdot 0.924 \cdot Y \quad (6)$$

for $|X| - |Y| < 0$ $$\cos \Delta\theta = \text{Sgn}[X] \cdot 0.383 \cdot X + \text{Sgn}[Y] \cdot 0.924 \cdot Y \quad (7)$$

$$\sin \Delta\theta = \text{Sgn}[Y] \cdot 0.924 \cdot X - \text{Sgn}[X] \cdot 0.383 \cdot Y \quad (8)$$

In these formulae, the terms 0.924 and 0.383 are $\cos 22°5$ and $\sin 22°5$, respectively.

From the foregoing explanations it follows that, when the device for restituting the clock pulses according to the invention is used for octovalent modulation the calculating device 30 has the structure shown in FIG. 1, with the exception of the input circuit 31 in which the samples $\cos \Delta\theta$ and $\sin \Delta\theta$ are calculated in accordance with the formulae (5), (6) or (7), (8), depending on the sign of $|X| - |Y|$.

For octovalent modulation this input circuit 31 may be of the construction, shown in FIG. 9. It comprises the circuits 60 and 61 to detect the sign of the samples X and the sign of the samples Y, respectively, and rectifying circuits 62 and 63 for forming the absolute values of X and Y, respectively. The comparator circuit 64 connected to the output of the rectifying circuits 62 and 63 produces a logic signal whose value depends on the difference $|X| - |Y|$. The output signals of the circuits 60, 61 and 64 together provide the information by means of which it is possible to detect to which phase section the phase of the received signal belongs at each sampling instant. From this information the samples $\cos \Delta\theta$ and $\sin \Delta\theta$ are formed in the following manner. The output of the comparator circuit 64 controls simultaneously the two change-over circuits 65 and 66 so as to apply the numbers 0.924 or 0.383, present in the formulae (5) to (8) to an input of the multiplying circuits 67 and 68. The other input of these multiplying circuits is connected to the output of the sign detection circuits 60 and 62. In FIG. 9 the change-over circuits 65 and 66 are in the position corresponding to $|X|-|Y|>0$ and pass the numbers 0.924 and 0.383 onto the multiplying circuits 67 and 68, respectively. The products formed in the circuits 67, 68, Sgn (X).0.924 and Sgn(Y).0.383, are applied to respective inputs of the multiplying circuits 69 and 70, whose other inputs receive the samples X and Y, respectively. The products formed in the circuits 69 and 70 are applied to the adder circuit 61, which forms the sum indicated in the formula (5), that is to say the samples cos $\Delta\theta$. The products formed in the multiplying circuits 72 and 73, whose other input receives the samples Y and X, respectively, are applied to a subtracting circuit 74, which forms the difference indicated in the formula (6), that is to say the samples sin $\Delta\theta$.

When the comparator circuit 64 detects that $|X|-|Y|<0$ the change-over circuits 65 and 66 occupy the positions opposite to the positions shown in the FIG. 9, and it is easy to see that the samples cos $\Delta\theta$ and sin $\Delta\theta$ are calculated in accordance with formulae (7) and (8).

The digital samples cos $\Delta\theta$ and sin $\Delta\theta$, calculated in the circuit 31 in the above-described manner are converted into the analog form in the converters 40 and 41, and filtered thereafter in the filtering circuits 42 and 43, in accordance with the diagram of FIG. 1. The same difficulty is met in the filtering of the signal sin $\Delta\theta$, which is of the general shape shown in diagram 7a, wherein the discontinuities always occur for the phase shifts $\Delta\theta$ which are equal to the odd multiple of $\pi/8$ radians. This drawback is obviated by the same filtering circuit 63 which was described in detail in the foregoing.

In accordance with the formula (1), the circuits 44, 45 and 46 form the signal X'(t), whose passages through zero are used to control the clock pulse of the receiver, from the signals cos $\Delta\theta$ and sin $\Delta\theta$, converted into their analog form, and the demodulated signals X(t) and Y(t).

The above-described arrangement for restituting clock pulses according to the invention can also be used for a receiver for data transmitted by phase and amplitude modulation. Actually, the operation performed for forming the components K.X'(t) or K.Y'(t) corresponds to a phase shift of the received signal and the amplitude of the received signal acts only on the proportionality coefficient K which does not influence the passing through zero of these components.

What is claimed is:

1. An arrangement for restituting a clock included in the receiver of a system for the transmission of data by n-valent phase modulation of a carrier, and used to sample the demodulated signals formed by demodulation of the received signal with the modulating frequency by means of signals which are of the same phase and shifted 90° relative to a local carrier, this arrangement for restituting a clock comprising a circuit for controlling a local clock on the zero-passages of a signal characterized in that the circuit comprises local means to detect from the samples of said demodulated signals to which phase section, out of n possible phase sections of the transmitted signals, the phase of the received signal belongs at the sampling instants, and calculating means for forming the component which is of the same phase as, or the component which is shifted 90° relative to, the local carrier of a signal derived from the received signal by a phase shift $\Delta\theta$, so as to make its phase equal, at the sampling instants, to the centre phase of the said detected phase section, said component which is n phase with or shifted 90° relative to the local carrier constituting the signal whose zero transitions are used to control the local clock.

2. An arrangement for restituting a clock as claimed in claim 1, characterized in that it comprises logic means and calculating means to form at each sampling instant the samples [K.cos $\Delta\theta$] and [K.sin $\Delta\theta$], K being a proportionality coefficient, two multiplying circuits for forming either the two products X(t)·[K. cos $\Delta\theta$] and Y(t)·[K sin $\Delta\theta$] or the two products Y(t)·[K. cos $\Delta\theta$] and X(t)·[K. sin $\Delta\theta$], X(t) and Y(t) being the demodulated signals which are in-phase and shifted through 90°, respectively, and finally a combining circuit combining the said two products and furnishing the signal used to control the local clock.

3. An arrangement for restituting a clock as claimed in claim 2, characterized in that the samples [K. cos $\Delta\theta$] and [K. sin $\Delta\theta$] are applied to filtering circuits, particularly to suppress the noise, the filtering circuit filtering the samples [K. sin $\Delta\theta$] comprising a first filter which receives the said samples and supplies a signal which is applied to a sign detection circuit, a second filter receiving the said samples by means of a rectifier circuit and finally means to assign the sign supplied by the said sign detector circuit to the output signal of the second filter.

4. An arrangement for restituting a clock as claimed in any of the claims 1 to 3, and suitable for a receiver for data transmitted by means of tetravalent phase modulation of a carrier, characterized in that it comprises logic means to detect the sign of the samples X and Y of the demodulated signals, in the form of the signals Sgn[X] and Sgn[Y], means for forming the first products X.Sgn[X], Y.Sgn[Y] and the second products X.Sgn[Y], Y.Sgn[X], and finally a circuit for combining the first products to form the samples $\sqrt{2}$. cos $\Delta\theta$ and a circuit for combining the second products to form the samples $\sqrt{2}$. sin $\Delta\theta$.

5. An arrangement for restituting a clock as claimed in any of the claims 1 to 3 and suitable for a receiver of data transmitted by octovalent phase modulation of a carrier, characterized in that it comprises logic means to detect the sign of the samples X and Y of the demodulated signals, in the form of the signals Sgn[X] and Sgn[Y], and to detect the sign $|X|-|Y|$, [X] and [Y] being formed by rectification of the samples X and Y, change-over means associated with the multiplying circuits and controlled in accordance with the sign of $|X|-|Y|$ to form the first products Sgn[X]·X. $K_1$ (or $K_2$) and Sgn[Y]·Y.$K_2$ (or $K_1$ and to form the second products Sgn[Y]. X.$K_2$ (or $K_1$) and Sgn[X]. $K_1$ (or $K_2$), a circuit for combining the first products forming the samples cos $\Delta\theta$ and a circuit for combining the second products forming the samples sin $\Delta\theta$.

6. An arrangement for restituting a clock as claimed in claim 5, used in a receiver for data transmitted by means of phase and amplitude modulation of a carrier.

* * * * *